United States Patent
Ogawa

[19]
[11] Patent Number: 5,964,428
[45] Date of Patent: Oct. 12, 1999

[54] RETRACTOR FOR A SEAT BELT

[75] Inventor: Kiyoshi Ogawa, Kanagawa, Japan

[73] Assignee: NSK Ltd., Tokyo, Japan

[21] Appl. No.: 09/151,698

[22] Filed: Sep. 11, 1998

[30] Foreign Application Priority Data

Sep. 16, 1997 [JP] Japan .................................. 9-250715

[51] Int. Cl.$^6$ ................................................ B60R 22/28
[52] U.S. Cl. ........................................................ 242/379.1
[58] Field of Search ........................ 242/379.1; 280/805, 280/806; 297/470, 471, 472; 267/154, 273

[56] References Cited

U.S. PATENT DOCUMENTS

| 3,741,494 | 6/1973 | Fiala . | |
|---|---|---|---|
| 3,857,528 | 12/1974 | Fiala | 242/379.1 |
| 3,929,300 | 12/1975 | Lindqvist . | |
| 4,366,934 | 1/1983 | Seifert . | |
| 5,520,376 | 5/1996 | Langa et al. | 267/154 |
| 5,722,611 | 3/1998 | Schmid et al. | 242/379.1 |
| 5,820,058 | 10/1998 | Hirzel et al. | 242/379.1 |

FOREIGN PATENT DOCUMENTS 2-45088  11/1990  Japan .

*Primary Examiner*—John M. Jillions
*Attorney, Agent, or Firm*—Sughrue, Mion, Zinn, Macpeak & Seas, PLLC

[57] ABSTRACT

A seat belt retractor 100 with an energy absorbing member 2 of a torsion bar which is coupled at one end with a bobbin 3 and at the other end with a locking base 5 is disclosed. The energy absorbing member 2 includes an energy absorbing portion 2c that is torsionally deformable, and fixing portions 2a and 2b provided at both ends of the energy absorbing portion 2c. A hardness of each of the coupling portions 2a and 2b is larger than that of the energy absorbing portion 2c.

5 Claims, 3 Drawing Sheets

RETRACTOR FOR A SEAT BELT

BACKGROUND OF THE INVENTION

The present invention relates to a retractor for a seat belt device, and more particularly to a seat belt retractor having an energy absorbing mechanism including a torsion bar.

A retractor for seat belt of a motor vehicle is used for restraining an occupant on a seat of the vehicle to secure a safety of the occupant. In this field of the seat belt retractor, an emergency-locking type belt retractor is used which includes an emergency locking mechanism for physically locking a retractor by means of an inertia sensing means responding to abrupt acceleration, impact, or abrupt deceleration, whereby it effectively and safely restrains the occupant.

U.S. Pat. No. 3,929,300 and U.S. Pat. No. 4,366,934, and Japanese Utility Model Examined Publication No. Hei.2-45088 may be enumerated for the conventional techniques for the emergency-locking type belt retractor. In the locking mechanism disclosed in those documents, an engaging member which is provided at one end of a take-up shaft on which a webbing is wound, in case of emergency, comes in engagement with an engaging-member receiving part of a retractor base, to thereby lock the rotation of the take-up shaft in the web draw-out direction.

When an impact force by collision is extremely large, a webbing tension increases with the elapsing of time after the collision. As a result, an abrupt deceleration acts on the occupant body, and a load acting on the occupant is extremely large. Various proposals to cope with this problem have been made. One of those proposals uses an energy absorbing mechanism which absorbs an impact force acting on the occupant body in such a manner that when a load acting on the webbing exceeds a predetermined value of load, it allows the seat belt to be drawn out a predetermined length of the seat belt. A specific example of the proposal is taught by U.S. Pat. No. 3,741,494, entitled "Energy Absorber for Automobile Safety Belt".

The energy absorber includes a take-up member (bobbin) serving as a portion through which a force is transmitted in the energy absorber, a holder (retractor base) rotatable relative to the take-up member, and a torsion bar (energy absorbing mechanism) which is located between the holder and the take-up member. When the take-up shaft is locked in case of emergency and then a load acts on the locking means, the torsion bar per se is twisted to absorb an impact energy acting on the occupant as a deformation work of the torsion bar.

The torsion bar disclosed in U.S. Pat. No. 3,741,494 follows. A torque is applied to one end of the torsion bar of which the other end is fixed, to thereby plastically deform the torsion bar. During the twisting of the torsion bar, the fixing ends as both ends of the torsion bar and the torque input terminal need hold the torsion bar by sufficiently large holding force.

Where the hardness of the torsion bar is uniform over its entire length, to secure a large holding force, the section moduli of the cross sections of both ends of the torsion bar must be set at large values correspondingly. Therefore, the necessity is to increase the size of both ends of the torsion bar, and size increase of the components parts located near the torsion bar is unavoidable. The result is that the seat belt retractor per se is increased in size.

SUMMARY OF THE INVENTION

Accordingly, an object of the present invention is to provide a seat belt retractor which can secure large holding forces at both ends of an energy absorbing member, with a simple construction.

To achieve the above object, there is provided a seat belt retractor comprising:
  a retractor base;
  a bobbin coupled with a webbing;
  a torsion bar rotatably supported on the retractor base and having one end which is coupled with the bobbin; and
  a locking mechanism taking a first status where the emergency locking mechanism couples the retractor base with the other end of the torsion bar and a second status where the emergency locking mechanism does not couple the retractor base with the other end of the torsion bar,
  in which the torsion bar has an energy absorbing portion, torsionally deformable, provided between the one and other ends of the torsion bar, and at least one of the one and the other ends has a hardness larger than the energy absorbing portion.

In the above-mentioned seat belt retractor according to the present invention, advantageously, a Rockwell hardness difference between at least one of the one and other ends of the torsion bar and the energy absorbing portion thereof is in the range from 10 to 20 both inclusive.

In the above-mentioned seat belt retractor according to the present invention, advantageously, the one and other ends of the torsion bar are equal in hardness.

Further, the above-mentioned object can also be attained by a seat belt retractor, according to the present invention, comprising:
  a shaft rotatably mounted on a retractor base;
  a bobbin fastened to one end of the shaft and wound by a webbing;
  a locking member fastened to the other end of the shaft;
  an emergency locking mechanism which in case of emergency, couples the locking member with the retractor base to lock the rotation of the locking member in a webbing taking-up direction;
  an energy absorbing portion, torsionally deformable, provided between the one and other ends of the shaft, at least one of the one and other ends of the shaft having a larger hardness than the energy absorbing portion.

The fixing portions provided at at least one of both ends of the energy absorbing portion of the shaft have each a larger hardness than the energy absorbing portion. The fixing portions exhibit large holding forces when the energy absorbing is carried out, even if the fixing portions are small in size. Therefore, the torsion bar is held firmly and stably. Therefore, the torsion bar and its neighboring component parts may be reduced in size.

A hardness (Rockwell hardness) of the energy absorbing portion is preferably about 60 to 75; a hardness of each of the fixing portions at both ends of the torsion bar is preferably about 80 to 95; and a hardness difference between the energy absorbing portion and the fixing portions is preferably about 10 to 20.

DETAILED DESCRIPTION OF THE PREFERRED EMBODIMENTS

Figure 1:
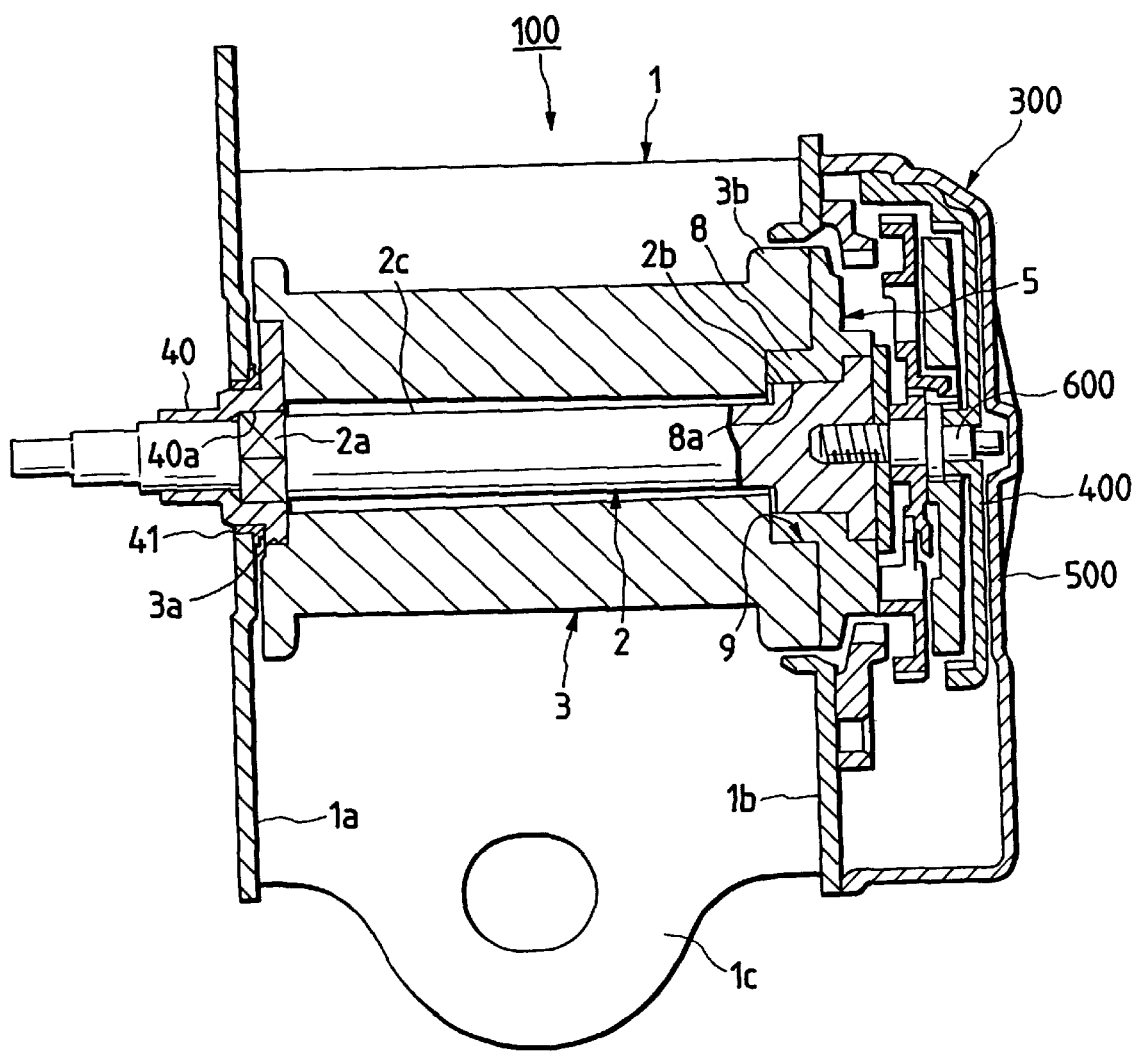
FIG. 1 is a front, longitudinal sectional view showing a seat belt retractor which is an embodiment of the present invention.

The preferred embodiment of the present invention will be described with reference to the accompanying drawings. FIG. 1 is a front, longitudinal sectional view showing a seat belt retractor 100 which is an embodiment of the present invention.

The seat belt retractor 100 generally includes a bobbin 3, substantially cylindrical, on which a webbing is wound, an energy absorbing member 2 substantially consisting of a torsion bar, and an emergency locking mechanism 300. The energy absorbing member 2 substantially consists of a torsion bar which is inserted into the bobbin 3 and is rotatably supported on a retractor base 1. One end (the left end) of the energy absorbing member 2 is coupled with the bobbin 3, while the other end (the right end in FIG. 1) is coupled with a locking base 5 shaped like a disc. The emergency locking mechanism 300, in case of emergency, locks the rotation of the locking base 5 in the webbing draw-out direction.

The retractor base 1 has a back plate 1c to be fastened on the vehicle body, and right and left side plates 1a and 1b standing upright on the right and left sides of the back plate 1c. The retractor base 1 is formed by shaping, by press, a hard metal plate to be like U in cross section. The energy absorbing member 2 combined with the bobbin 3 is rotatably stretched between the right and left side plates 1a and 1b. A known take-up spring (not shown), which constantly urges the bobbin 3 in the webbing taking-up direction with the energy absorbing member 2 interposing therebetween, is provided at one end of the energy absorbing member 2, which is placed in the side plate 1a of the retractor base 1.

A bobbin coupling portion 2a is provided at one end of the energy absorbing member 2. With provision of the bobbin coupling portion 2a, the energy absorbing member 2 is rotatable together with the bobbin 3. A locking base coupling portion 2b is provided at the other end of the energy absorbing member 2. With provision of the locking base coupling portion 2b, the energy absorbing member 2 is rotatable together with the locking base 5. Those coupling portions 2a and 2b are hexagonal in cross section.

A retainer 40 having an insertion hole 40a, hexagonal in cross section, is fit to a recess 3a of one side of the bobbin 3. The bobbin coupling portion 2a is inserted into the insertion hole 40a. With this coupling structure, the bobbin coupling portion 2a is rotatable together with the bobbin 3. The retainer 40 is rotatably supported on the side plate 1a of the retractor base 1 in a state that a bush 41 is interposed therebetween.

The locking base coupling portion 2b, hexagonal in cross section, is inserted into an insertion hole 8a, also hexagonal in cross section, of a cylindrical boss portion 8 protruded from the end surface of the locking base 5 that is closer to the bobbin. With this, the locking base coupling portion 2b is rotatable together with the locking base 5.

A recess 9 for receiving the boss portion 8 of the locking base 5 is formed in the end face of the bobbin 3 that is closer to the bobbin 3. The locking base 5 is rotatable with respect to the bobbin 3 with the aid of the recess 9. Since the bobbin 3 twists the energy absorbing member 2, the bobbin coupling portion 2a is immovable in rotation with respect to the energy absorbing member 2, but in the course of energy absorbing process, the bobbin coupling portion 2a is rotatable about the boss portion 8 with respective to the locking base 5.

Figure 2:
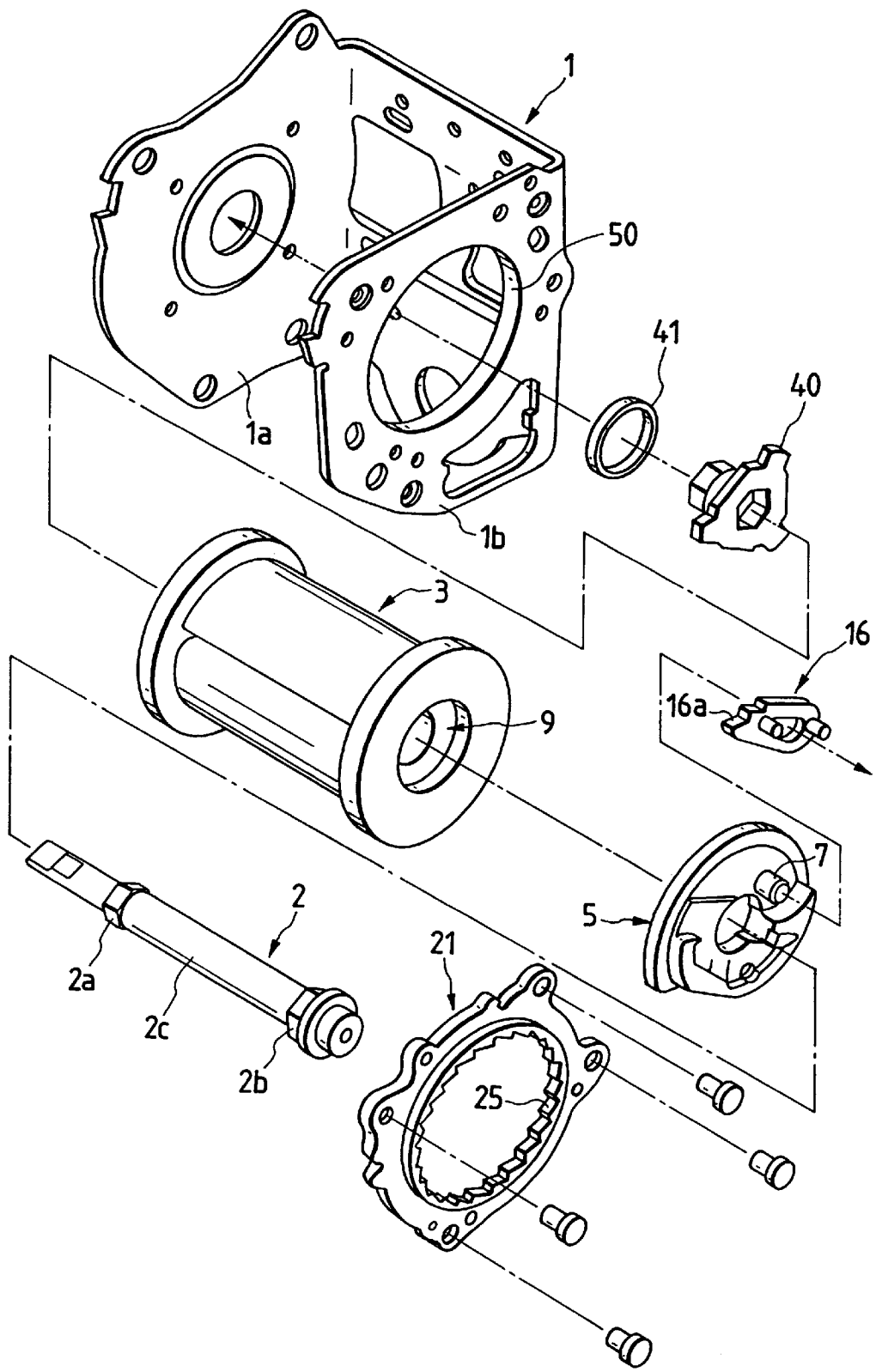
FIG. 2 is an exploded view showing a major portion of the seat belt retractor of FIG. 1.

The emergency locking mechanism 300 for locking the rotation of the locking base 5 in the webbing draw-out direction in case of danger may be constructed by known technique. A specific example of the emergency locking mechanism 300 is illustrated in FIG. 2. A pawl 16 having locking teeth 16a at its tip is rotatably supported on a support shaft 7 of the locking base 5. A ratchet 21 having a circular hole defined by the toothed wall or inner teeth 25 is disposed on the outside of the circumferential inner surface 50 defining a circular hole formed in the right side plate 1b in a juxtaposed fashion. The inner teeth 25 of the ratchet 21 are to be in engagement with the locking teeth 16a =l of the pawl 16.

In the emergency locking mechanism 300 that is disposed on the inside of a sensor cover 500, the locking teeth 16a of the pawl 16 is brought into engagement with one of the inner teeth 25 of the ratchet 21, to thereby lock the rotation of the locking base 5 in the webbing taking-up direction.

The construction of the energy absorbing member 2 which is essential to the present invention will be described with reference to FIG. 3. When a torque in excess of a predetermined value of torque acts on the bobbin and locking base coupling portions 2a and 2b, these coupling portions are torsionally deformed to absorb the energy of the impact force acting on the body of the occupant.

Figure 3:
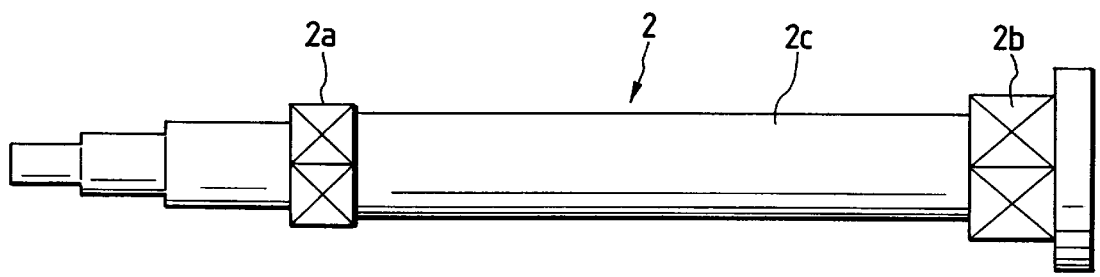
FIG. 3 is a side view showing an energy absorbing member used in the seat belt retractor.

As best illustrated in FIG. 3, the energy absorbing member 2 of the torsion bar is composed of the bobbin coupling portion 2a, hexagonal in cross section, located at one end of the energy absorbing member 2, the locking base coupling portion 2b, also hexagonal in cross section, located at the other end thereof, and an energy absorbing portion 2c circular in cross section. The bobbin coupling portion 2a is coupled with the bobbin 3 so that it is rotatable together with the bobbin 3, and serves as a torque input end of the energy absorbing member 2. The locking base coupling portion 2b is coupled with the locking base 5 so that it is rotatable together with the locking base 5, and serves as a fixed end of the energy absorbing member 2. The energy absorbing portion 2c is torsionally deformed. The coupling portions 2a and 2b are somewhat larger in diameter than the energy absorbing portion 2c. A Rockwell hardness of each of the bobbin coupling portion 2a and the locking base coupling portion 2b of the energy absorbing member 2 is 80 or larger, and a Rockwell hardness of the energy absorbing portion 2c is 55 to 75. A hardness difference between the energy absorbing portion and the fixing portions is set to be in a range from 5 to 40. Thus, the hardness of the coupling portions 2a and 2b provided at both ends of the energy absorbing portion 2c is larger than that of the energy absorbing portion 2c.

In the present invention, a hardness (Rockwell hardness) of the energy absorbing portion is preferably about 60 to 75; a hardness of each of the fixing portions at both ends of the torsion bar is preferably about 80 to 95; and a hardness difference between the energy absorbing portion and the fixing portions is preferably about 5 to 35, more preferably about 10 to 20.

Figure 4:
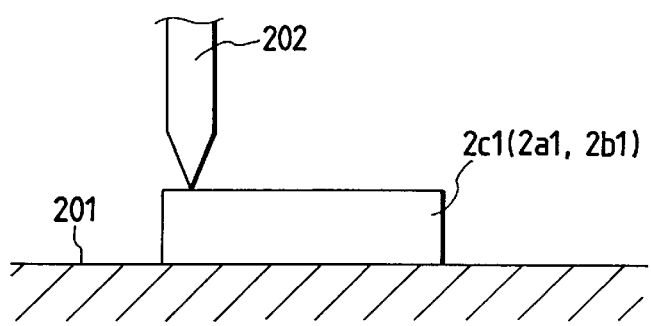
FIG. 4 is a diagram showing a hardness measuring method used for measuring a hardness at each key position of the energy absorbing member.

An example of a hardness measuring method is illustrated in FIG. 4.

The bobbin coupling portion 2a, locking base coupling portion 2b and energy absorbing portion 2c are cut into test pieces 2a1, 2b1 and 2c1 each having a predetermined thickness in the axial direction.

Each test pieces 2a1, 2b1 and 2c1 is placed on, for example, a table in a state that one of the major flat surfaces 201 of the test piece is put on the table. To measure the hardness of the test piece, a hardness tester 202 is pressed from the above against the major flat surface 201 of the test piece put on the table. In this measurement, the hardness tester 202 is preferably brought into contact with a position within an inner area about 1 to 2 mm apart from the periphery of each test piece.

To make a hardness difference between the energy absorbing portion 2c and the coupling portions 2a and 2b, any of the following methods may be used.

1) A work-hardening (plastic deformation) for the coupling portions 2a and 2b is set to be greater than that for the energy absorbing portion 2c.
2) A work-hardening is substantially uniformly applied to and over the entire range from the locking base coupling portion 2b to the bobbin coupling portion 2a of the energy absorbing member 2. A portion of the energy absorbing portion 2c thus work-hardened is cut out into a predetermined configuration so as to remove a hardened layer provided thereon.
3) Only the portions of the coupling portions 2a and 2b are metallurgically hardened.

An operation of the seat belt retractor thus constructed will be described. In case of emergency, e.g., when a vehicle collision occurs, the emergency locking mechanism 300 operates to lock the rotation of the locking base 5, coupled with the other end of the energy absorbing member 2, in the webbing draw-out direction. As the result of an abrupt forward movement of the occupant, the bobbin 3 receives a great torque in the webbing draw-out direction. Since the bobbin 3 is rotatably coupled with the locking base 5, when a torque by a webbing tension reaches a predetermined value of torque, the energy absorbing member 2 is twisted. Therefore, the bobbin 3 rotates to feed a preset amount of webbing at substantially constant webbing tension, while absorbing the dynamic energy of the occupant. At this time, the coupling portions 2a and 2b exhibit large holding forces for the energy absorbing member 2 although the cross section and the length of them are small, because the coupling portions 2a and 2b are larger in hardness than the energy absorbing portion 2c. In other words, the energy absorbing member 2 may be held firmly and stably.

This leads to size reduction of the coupling portions of the retainer 40 and the locking base 5 where those are coupled with the energy absorbing member 2.

In the above-mentioned embodiment, the energy absorbing member 2 is designed such that the coupling portions 2a and 2b are both larger in hardness than the energy absorbing portion 2c. If required, one of the coupling portions 2a and 2b may has a larger hardness than the energy absorbing portion 2c. Namely, in the case where it is permissible for one of the coupling portion 2a (or 2b) to have a larger size in view of a design of seat belt retractor, the other of the coupling portion 2b (or 2a) having a hardness larger than the energy absorbing portion 2c may be utilized. In this case, the same useful effect is produced at the hardness difference portion, as a matter of course.

As seen from the foregoing description, the energy absorbing member includes the energy absorbing portion, and a first fixing portion which is provided at one end of the energy absorbing member and coupled with the bobbin, and a second fixing portion which is provided at the other end and coupled with the locking base.

At least one of those fixing portions has a larger hardness than the energy absorbing portion. Therefore, large holding force is secured at least one of both ends of the energy absorbing member during the course of energy absorbing without increasing the size of the fixing portion since the fixing portion is harder than the energy absorbing member.

In the present invention, preferably, both of those fixing portions have a larger hardness than the energy absorbing portion. Therefore, large holding forces are secured at both ends of the energy absorbing member during the course of energy absorbing without increasing the size of the fixing portions since the fixing portions are harder than the energy absorbing member.

Thus, the energy absorbing member can stably be held while reducing the energy absorbing member and its vicinal component parts.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A seat belt retractor comprising:

a retractor base;

a bobbin coupled with a webbing;

a torsion bar rotatably supported on said retractor base and having one end which is coupled with said bobbin; and a locking mechanism taking a first state where said emergency locking mechanism couples said retractor base with the other end of said torsion bar and a second state where said emergency locking mechanism does not couple said retractor base with the other end of said torsion bar, in which said torsion bar has an energy absorbing portion, torsionally deformable, provided between said one and other ends of said torsion bar, and at least one of said one and the other ends has a hardness larger than said energy absorbing portion.

2. The seat belt retractor according to claim 1, wherein a Rockwell hardness difference between at least one of said one and other ends of said torsion bar and said energy absorbing portion thereof is in the range from 10 to 20 both inclusive.

3. The seat belt retractor according to claim 1, wherein said one and other ends of said torsion bar are equal in hardness.

4. The seat belt retractor according to claim 2, wherein said one and other ends of said torsion bar are equal in hardness.

5. A seat belt retractor comprising:

a shaft rotatably mounted on a retractor base;

a bobbin fastened to one end of to said shaft and wound by a webbing;

a locking member fastened to the other end of said shaft;

an emergency locking mechanism which in case of emergency, couples said locking member with said retractor base to lock the rotation of said locking member in a webbing taking-up direction;

an energy absorbing portion, torsionally deformable, provided between said one and other ends of said shaft, at least one of said one and other ends of said shaft having a larger hardness than said energy absorbing portion.

* * * * *